(12) United States Patent
Nemoto

(10) Patent No.: US 6,419,041 B1
(45) Date of Patent: Jul. 16, 2002

(54) HYDROSTATIC TRANSMISSION AND POWER TRANSMISSION ARRANGEMENT WITH THE SAME FOR VEHICLE

(75) Inventor: Shusuke Nemoto, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/702,855

(22) Filed: Nov. 1, 2000

(30) Foreign Application Priority Data

Nov. 4, 1999 (JP) .......................................... 11-313281

(51) Int. Cl.$^7$ .............................................. B60K 17/00
(52) U.S. Cl. ...................... 180/377; 180/292; 180/337; 180/344; 74/687
(58) Field of Search ................................ 180/53.1, 337, 180/344, 6, 377, 8, 292; 60/487; 74/687

(56) References Cited

U.S. PATENT DOCUMENTS

| | | | | |
|---|---|---|---|---|
| 4,046,029 A | * | 9/1977 | Sugden | 74/687 |
| 4,856,367 A | * | 8/1989 | Nemoto | 74/606 R |
| 4,893,524 A | * | 1/1990 | Ohashi et al. | 74/687 |
| 5,596,872 A | * | 1/1997 | Payne | 60/468 |
| 5,694,816 A | * | 12/1997 | Okada et al. | 74/606 R |
| 5,752,417 A | * | 5/1998 | Okada et al. | 74/606 R |
| 5,927,073 A | * | 7/1999 | Ishizaki et al. | 60/487 |
| 5,950,500 A | * | 9/1999 | Okada et al. | 74/606 R |
| 6,014,861 A | * | 1/2000 | Hauser et al. | 60/487 |
| 6,301,885 B1 | * | 10/2001 | Johnson et al. | 60/487 |

FOREIGN PATENT DOCUMENTS

JP      11-91379      4/1999

* cited by examiner

*Primary Examiner*—Brian L. Johnson
*Assistant Examiner*—Deanna Draper
(74) *Attorney, Agent, or Firm*—Sterne, Kessler, Goldstein & Fox, P.L.L.C.

(57) ABSTRACT

An HST used for vehicle with a vehicle body, which includes a hydraulic pump, a hydraulic motor fluidly connected with the hydraulic pump, a housing accommodating the hydraulic pump and the hydraulic motor, a hydraulic pump block supporting the hydraulic pump and a hydraulic motor block separately arranged from the hydraulic pump block and supporting the hydraulic motor. The housing constitutes at least a part of the vehicle body. The hydraulic pump and the hydraulic motor are disposed along the vehicle longitudinal axis via the hydraulic pump block and the hydraulic motor block. The present invention also provides a power transmission arrangement with the HST for vehicle.

8 Claims, 11 Drawing Sheets

HYDROSTATIC TRANSMISSION AND POWER TRANSMISSION ARRANGEMENT WITH THE SAME FOR VEHICLE

BACKGROUND OF THE INVENTION

The present invention relates to a hydrostatic transmission (hereinafter referred to as HST) that constitutes at least a part of the frame of a vehicle body, and a power transmission arrangement with the HST for vehicle.

Already-known attempts to simplify the arrangement of the vehicle and reduce the cost of the vehicle have involved the use of the housing of the HST also as a part of the frame of the vehicle body, as disclosed in for example Japanese Unexamined Patent Application Publication (Kokai) No. 11-91379.

The HST described in the above-cited Japanese Publication has a hydraulic pump and a hydraulic motor, both of which are mounted on a single block and disposed on the vehicle body via the single block to be aligned parallel to the vehicle width direction. The HST of this arrangement poses the following problems:

If there arises the necessity of increasing the volumes of the hydraulic pump and the hydraulic motor for the vehicle with a high power spec, it will be necessary to mount a block with a large mounting area allowing the large-sized hydraulic pump and hydraulic motor to be aligned parallel to the vehicle width direction on the vehicle body. This may lead to the increase in size of the housing for accommodating such large sized pump and motor, and also the increase in size of the vehicle body itself.

An additional problem inherent to the HSI of the above arrangement lies in the fact that, since the hydraulic pump and the hydraulic motor are to be mounted within the housing together with the block supporting them, these combined members have heavy weight, which may deteriorate the working efficiency. This problem also arises during the hydraulic pump and the hydraulic motor are dismounted from the housing for the maintenance or the like.

As still another problem, the hydraulic pump and the hydraulic motor disposed in one position along the vehicle longitudinal axis may deteriorate the weight balance of the vehicle body.

SUMMARY OF THE INVENTION

The present invention has been conceived to solve the above problems. It is an object of the present invention to provide an HST with a housing constituting at least a part of the frame of the vehicle body, which is capable of limiting the increase in size of the frame of the vehicle body, which increase is caused by the increase in size of the hydraulic pump and the hydraulic motor, as well as a power transmission arrangement with the HST for vehicle.

To achieve the above object, there is provided an HST used for vehicle with a vehicle body, which includes a hydraulic pump, a hydraulic motor fluidly connected with the hydraulic pump, a housing accommodating the hydraulic pump and the hydraulic motor, a hydraulic pump block supporting the hydraulic pump and a hydraulic motor block separately arranged from the hydraulic pump block and supporting the hydraulic motor. The housing constitutes at least a part of the vehicle body. The hydraulic pump and the hydraulic motor are disposed along the vehicle longitudinal axis via the hydraulic pump block and the hydraulic motor block.

With the above arrangement, the housing can be manufactured in a reduced size, and hence the vehicle body can have a reduced size. As a result, the vehicle body can be manufactured at low cost. The arrangement with the hydraulic pump and the hydraulic motor respectively supported on the separately arranged blocks can also improve the working efficiency in mounting the hydraulic pump and the hydraulic motor in the housing or dismounting them from the housing. Moreover, unlike the conventional arrangement, it is possible to prevent the hydraulic pump and the hydraulic motor from being concentrated into one position along the vehicle longitudinal axis, resulting in the improved weight balance of the vehicle body.

The hydraulic pump block and the hydraulic motor block may be enclosed by the housing. This arrangement can effectively prevent the blocks from being subjected to the load (bending stress) acting on the vehicle frame. Accordingly, damages against the blocks can be prevented. Moreover, this arrangement can effectively prevent the hydraulic fluid accidentally leaked through hydraulic fluid passages formed in the blocks from flowing to the outside of the housing.

The hydraulic pump and the hydraulic motor may be disposed in sequence from the upstream side to the downstream side of a power transmission path. In this arrangement, the housing has an inner peripheral wall provided with a flange radially inwardly extending from the inner peripheral wall, and the hydraulic pump block is mounted on the flange. The thus arranged flange is formed throughout the circumference of at least a lower side of the inner peripheral wall in the first, housing section. According to this arrangement, it is possible to use as a hydraulic fluid tank a region of the housing on the downstream side of the flange with respect to the power transmission path.

Moreover, the HST may also include a charge pump for replenishing pressurized hydraulic fluid into a hydraulic circuit fluidly connecting the hydraulic pump with the hydraulic motor. In this arrangement, at least one of the hydraulic pump, the hydraulic motor and the charge pump is disposed within a space defined by the hydraulic pump block and the hydraulic motor block within the housing. The thus arranged HST can achieve the effective use of the space within the housing, thereby achieving the reduction in size of, the housing.

According to another aspect of the present invention, there is provided a power transmission arrangement for vehicle with a vehicle body, which includes an HST, a power take-off (PTO) shaft, a PTO power transmission shaft, and a clutch device. The HST in turn includes a hydraulic pump, a hydraulic motor, a housing, a hydraulic pump block, and a hydraulic motor block. The hydraulic pump has a pump shaft extending along the vehicle longitudinal axis and having a first end operatively coupled to a driving power source for enabling the driving power to be inputted to the pump shaft. The hydraulic motor has a motor shaft for non-stepwisely varying the speed of the driving power inputted to the pump shaft in cooperation with the hydraulic pump and then outputting the driving power through the motor shaft. The housing accommodates the hydraulic pump and the hydraulic motor, and designed to constitute at least part of the frame of the vehicle body. The hydraulic pump block and the hydraulic motor block respectively support the hydraulic pump and the hydraulic motor. The hydraulic pump and the hydraulic motor are disposed from the first side to the second side along the vehicle longitudinal axis respectively via the hydraulic pump block and the hydraulic motor block. The PTO shaft is adapted to take off the, driving power of the driving power source and transmit the same to the outside of the vehicle body. The PTO power transmission shaft is disposed on the second side of the pump shaft along the vehicle longitudinal axis and coaxially aligned with the pump shaft, and adapted to transmit the driving power between the pump shaft and the PTO shaft. The clutch device is disposed within a space in the housing defined by the hydraulic pump block and the hydraulic motor block for selectively transmitting the driving power of the pump shaft to the PTO power transmission shaft and shutting off the same.

The power transmission arrangement of the present invention can achieve the reduction in size of the housing, as well as improve the working efficiency in mounting the hydraulic pump and the hydraulic motor in the housing or dismounting them from the housing. Moreover, through the effective use of the space in the housing by disposing the clutch device in the space, it is possible to prevent the housing from being increased in size.

The power transmission arrangement may also include an output shaft disposed coaxially on the second side of the motor shaft along the vehicle longitudinal axis and aligned coaxially with the motor shaft, a counter shaft disposed parallel to the output shaft and operatively coupled to the motor shaft, and a power transmission mechanism for transmitting the driving power from the counter shaft to the output shaft. The counter shaft is a tubular shaft rotatably mounted on the PTO power transmission shaft. According to this arrangement, where the speed change is performed on the downstream side of the HST, it is possible to minimize the distance between the output shaft and the counter shaft, enabling the vehicle body itself to be reduced in size.

The power transmission mechanism may include a plurality of gear transmission devices respectively having different gear ratios. The power transmission mechanism is designed so that one of the plurality of gear transmission devices is selectively brought into engaging state.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
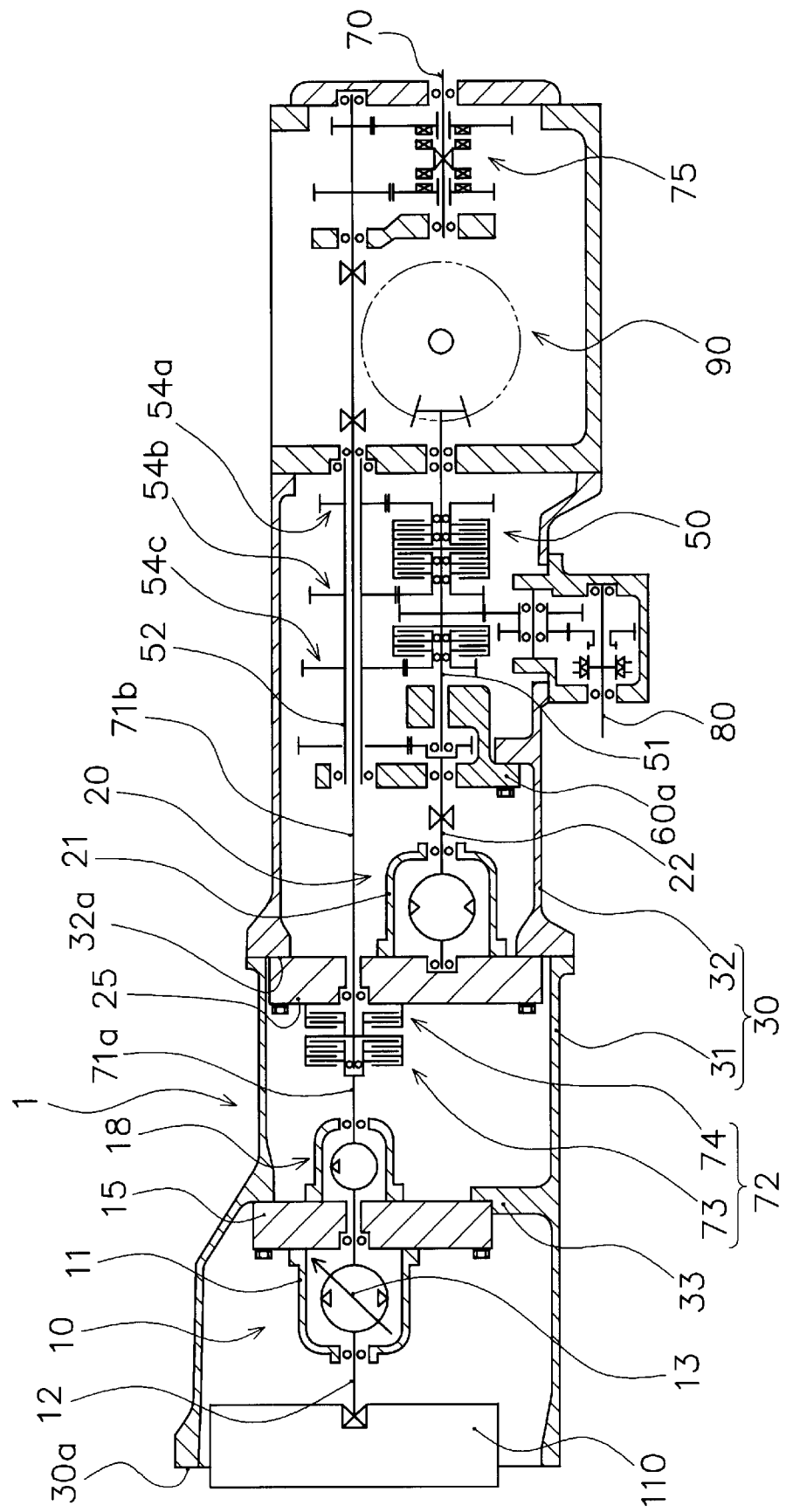
FIG. 1 is a typical view illustrating a part of a power transmission path of the vehicle with the HST according to a preferred embodiment of the present invention.
Figure 2:
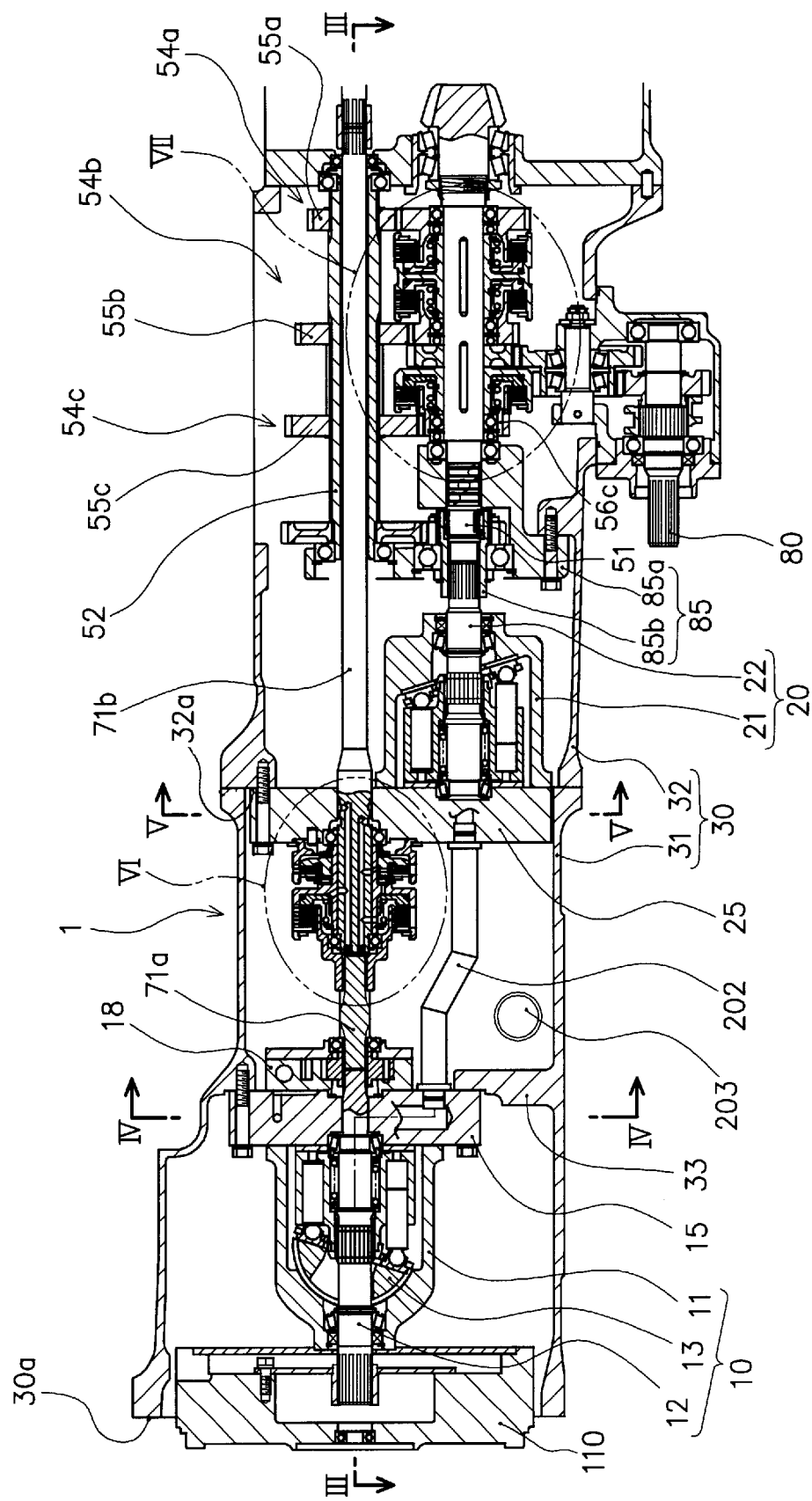
FIG. 2 is a longitudinal cross section of the HST and its vicinity of FIG. 1.
Figure 3:
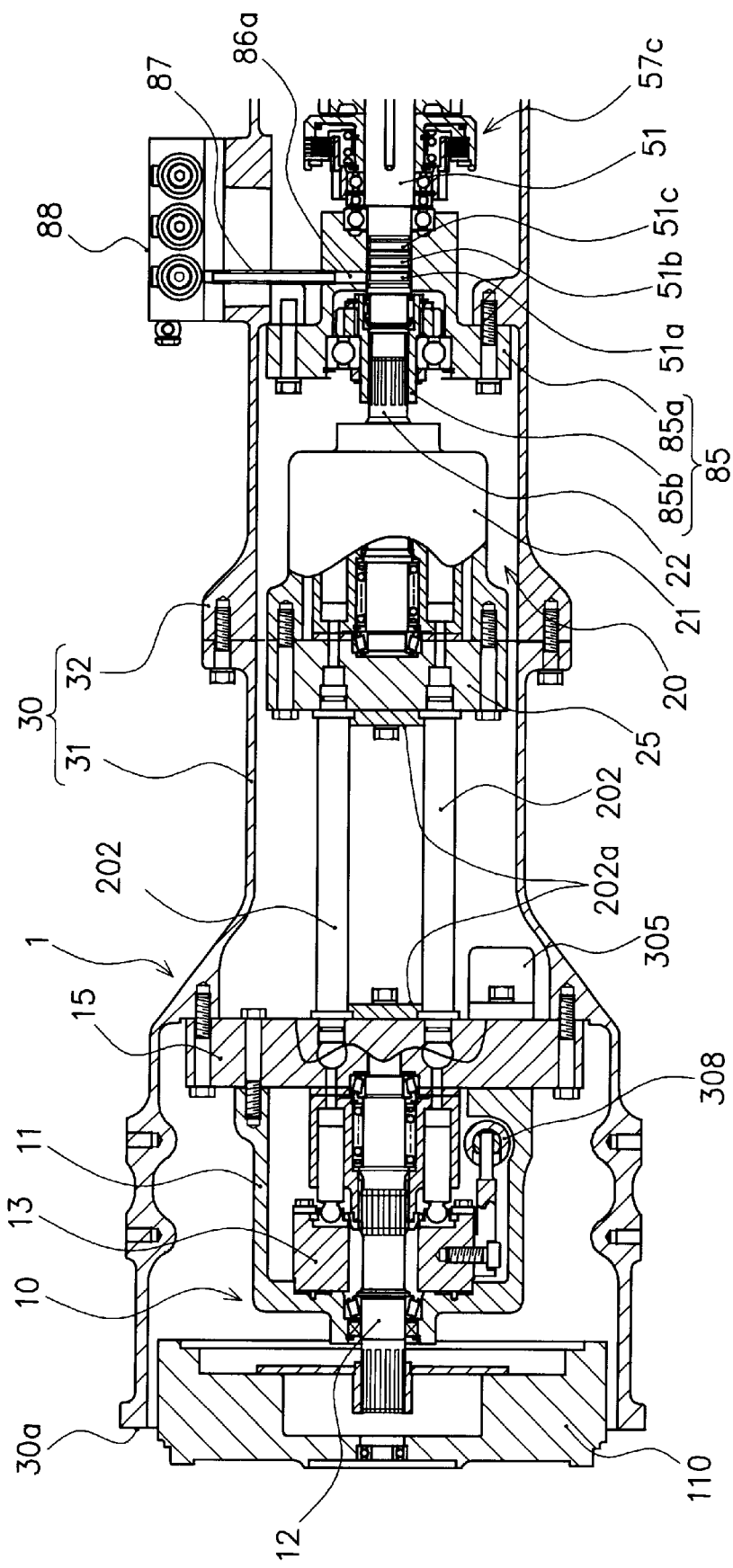
FIG. 3 is a cross section taken along lines III—III in FIG. 2.

Embodiments of the HST according to the present invention will be hereinafter described with reference to the accompanying drawings. FIG. 1 is a typical view illustrating a part of the power transmission path of the vehicle with the HST according to this embodiment. FIG. 2 is a longitudinal cross section of the HST and its vicinity. FIG. 3 is a cross section taken along lines III—III in FIG. 2.

Now, the schematic description of the power transmission path in the vehicle will be mace. In the vehicle, a driving power source (not shown), an HST 1 and a mechanical transmission 50 are disposed in sequence from one side to the opposite side of the vehicle body along the vehicle longitudinal axis. In this embodiment, these members are disposed in sequence from the front side to the rear side of the vehicle body.

The driving power from the driving power source is inputted to the HST, while a part of the driving power is adapted to be taken off via a PTO shaft 70. The driving power inputted to the HST 1 is non-stepwisely varied in the speed by the HST 1, and transmitted through the mechanical transmission 50 to a differential gear device 90 coupled to the rear axles and a driving power take off shaft 80 for the front wheels.

As illustrated in FIGS. 1 to 3, the HST includes a hydraulic pump 10 and a hydraulic motor 20, a block 15 and a block 25 respectively supporting the hydraulic pump 10 and the hydraulic motor 20, and a housing 30 for accommodating these and also constituting a part of the frame of the vehicle body.

The hydraulic pump includes a hydraulic pump body 11 supported on the hydraulic pump block 15, and a pump shaft 12 extending to the one side of the vehicle longitudinal axis (the front side in this embodiment) with a first end operatively coupled to the driving power source.

The hydraulic motor 20 includes a hydraulic motor body 21 supported on the hydraulic motor block 25 separately arranged from the hydraulic pump block 15, and a motor shaft 22 extending to the opposite side of the vehicle longitudinal axis (the rear side in this embodiment).

In the HST 1 of this embodiment, the hydraulic pump 10 is of a variable-displacement type that includes an angularly adjustable swash plate 13. With this arrangement, the driving force inputted to the pump shaft 12 can be no-stepwisely varied in speed and then outputted through the motor shaft 22 by the operation of the angularly adjustable swash plate 13.

The hydraulic pump 10 and the hydraulic motor 20 respectively mounted on the hydraulic pump block 15 and the hydraulic motor block 25 are placed within the housing 30 in alignment along the vehicle longitudinal axis. In this embodiment, the hydraulic pump 10 having the pump shaft 12 operatively coupled to the driving power source disposed at the front side of the vehicle is disposed at the front side of the vehicle longitudinal axis, while the hydraulic motor 20 is disposed on the rear side of the hydraulic pump 10 with respect to the vehicle longitudinal axis.

The housing 30 includes a first housing section 31 located closer to the front side of the vehicle body, and a second housing section located on the rear side of the first housing section 31, both sections being connected together in a liquid tight manner.

The thus aligned hydraulic pump 10 and hydraulic motor 20 along the vehicle longitudinal axis can limit the increase in size of the housing for accommodating themselves, thereby achieving the compactness of the vehicle body.

Specifically, the conventional arrangement with the hydraulic pump 10 and the hydraulic motor 20 supported on the single block necessitates the hydraulic pump and the hydraulic motor to be disposed at one position along the vehicle longitudinal axis or in alignment along the vehicle width direction. In this arrangement, the housing for accommodating these members needs to have an inner diameter allowing the lateral alignment of the hydraulic pump and the hydraulic motor. Particularly, when it is to be adapted to the vehicle with a high power spec, the HST needs to have a larger volume, for which the large sized hydraulic pump and hydraulic motor are necessarily aligned in the vehicle width direction. To accommodate such large sized pump and motor, it is necessary to increase the size of the housing. Since the housing is a member constituting at least a part of the frame of the vehicle body, the increase in size of the housing invites the increase in size of the vehicle body itself. Particularly, a driving seat disposed above the housing will be raised to an elevated position due to the increase in size of the housing, which leads to the vehicle with a higher center of gravity. This invites the deterioration in running performance of the vehicle, and difficulty for the driver in getting on and off the vehicle.

As an additional disadvantage associated with the conventional arrangement, the hydraulic pump and the hydraulic motor need to be mounted within the housing with the single block supporting them. During the mounting operation, such a single unified piece having a heavy weight involves the difficulty in installing to the housing for the assembly and removal from the housing for the maintenance and the like. This difficulty becomes more serious with the larger-sized hydraulic pump and hydraulic motor.

On the contrary, in this embodiment, the hydraulic pump 10 and the hydraulic motor 20 are not disposed in one position along the vehicle longitudinal axis in alignment along the vehicle width direction, but aligned along the vehicle longitudinal axis, so that the housing 30 can have a reduced size as compared with the conventional arrangement. Specifically, the arrangement of this embodiment allows the hydraulic pump 10 to have at least a portion overlapped to the hydraulic motor 20 as viewed in the vehicle longitudinal direction. Therefore, given that the same volume is provided to the hydraulic pump and the hydraulic motor, they can accomplish the decrease in size of the housing as compared with the conventional arrangement having the lateral arrangement of the hydraulic pump and the hydraulic motor.

The separately arranged blocks 15, 25, through which the hydraulic pump 10 and the hydraulic motor 20 are mounted in the housing 30, can improve the working efficiency in mounting or dismounting the hydraulic pump 10 and the hydraulic motor 20, as compared with the conventional HST with both the pump and motor supported on the single block.

As an additional advantage in this embodiment, the hydraulic pump 10 and the hydraulic motor 20 are prevented from being placed at one position along the vehicle longitudinal axis, resulting in the improved weight balance of the vehicle body.

Figure 4:
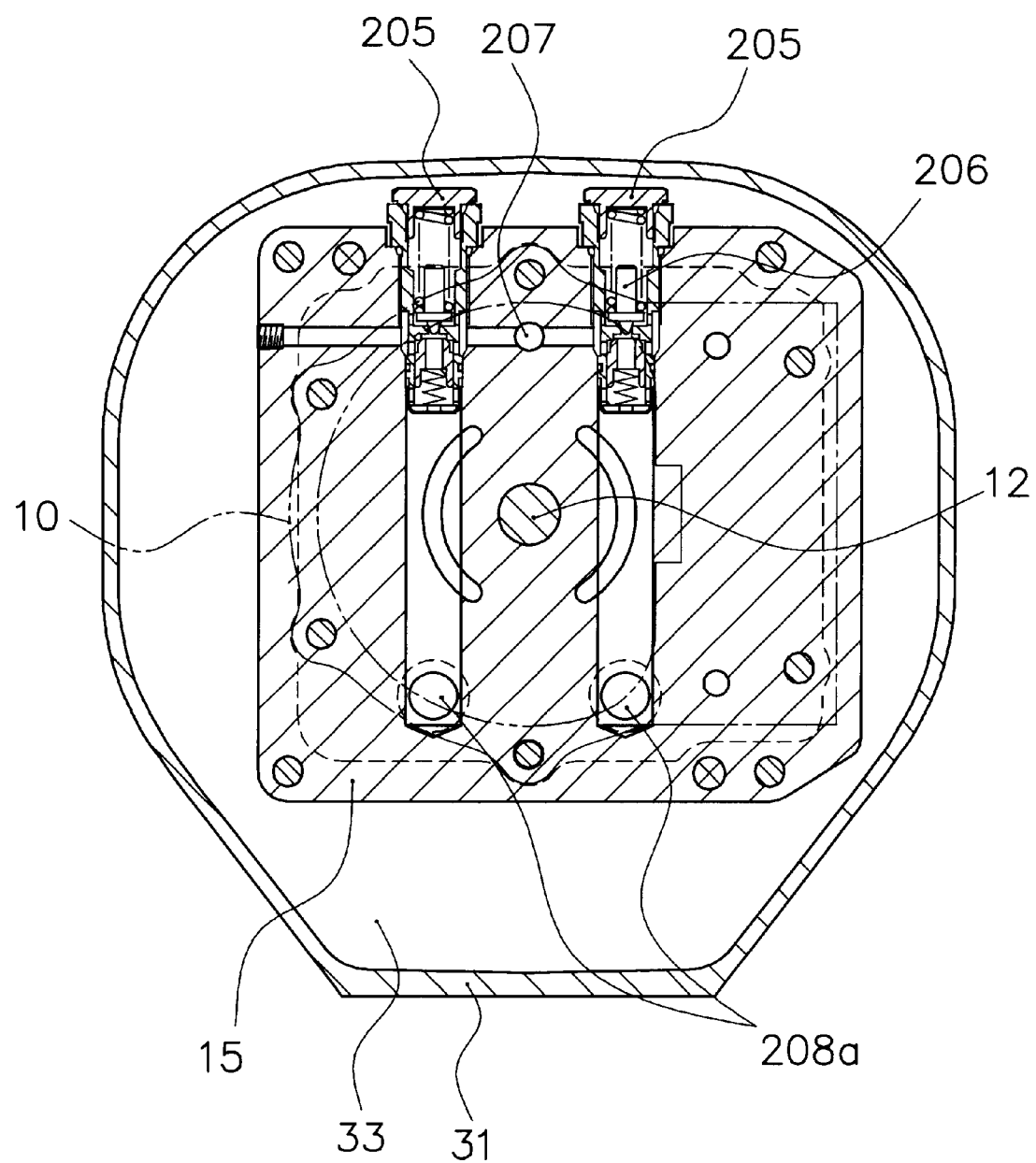
FIG. 4 is a cross section taken along lines IV—IV in FIG. 2.
Figure 5:
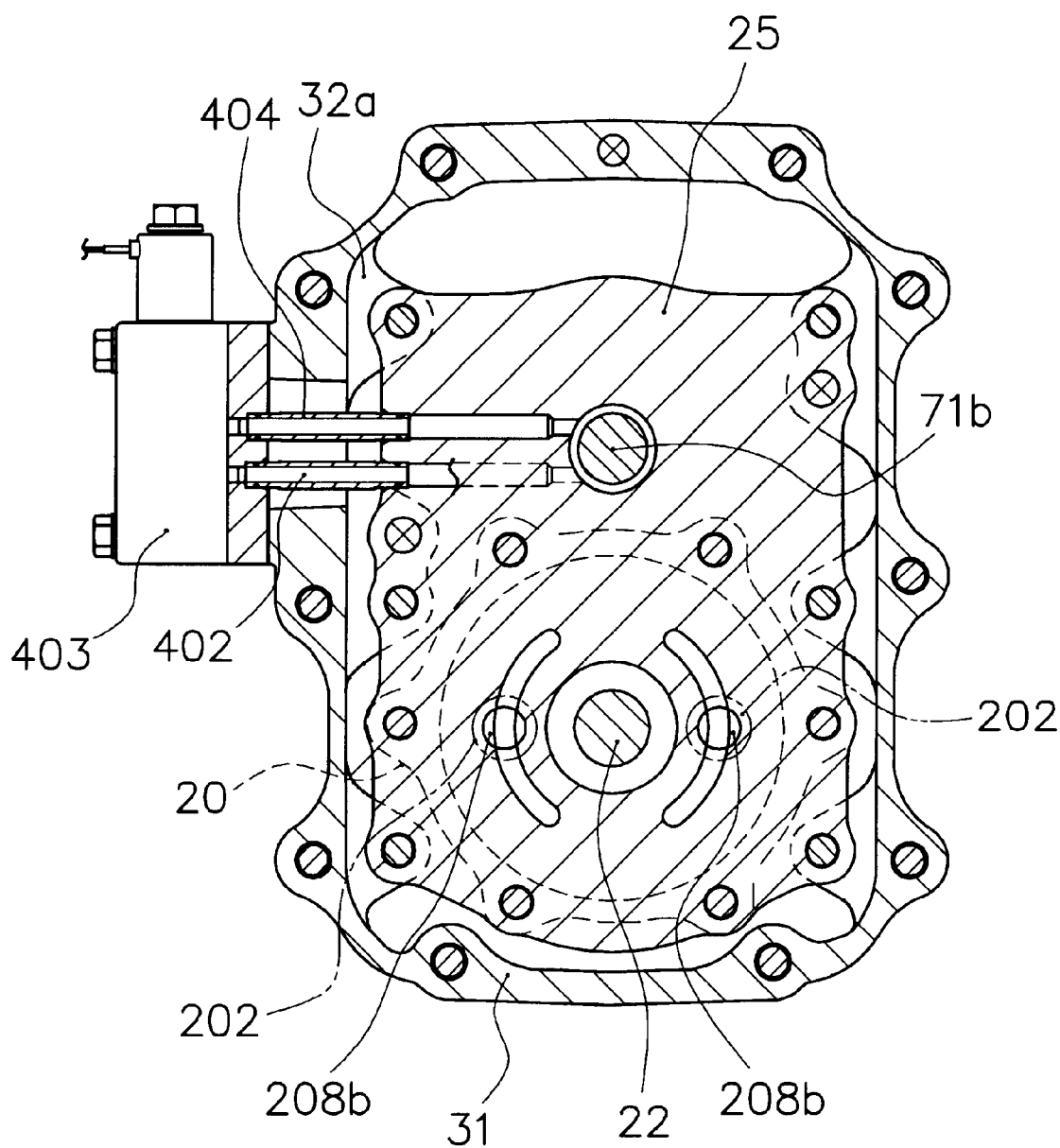
FIG. 5 is a cross section taken along lines V—V in FIG. 2.

FIGS. 4 and 5 respectively illustrate cross sections taken along lines IV—IV and V—V in FIG. 2. As illustrated in FIGS. 2 and 4, the first housing section 31 forms a flange 33 extending radially inwardly from the inner circumferential surface of the peripheral wall. The thus formed flange is located at substantially the longitudinal center of the first housing section 31. The hydraulic pump block 15 is mounted on the flange 33, while the hydraulic pump 10 is mounted on the front side of the hydraulic pump block 15.

The flange 33 is formed throughout the circumference in at least the lower portion of the first housing 31, thereby producing the following advantageous effects:

Where the housing 30 needs to serve also as a hydraulic fluid tank used in the HST or the like, it is necessary to provide a preventive measurement against the leakage of the hydraulic fluid from the housing. Accordingly, the joint of the housing 30 need to be sealed in a liquid tight manner, where the entire region of the housing is used as the hydraulic fluid tank.

However, since the housing has a front side commonly coupled to the driving power source, vibrations generated at the driving power source are directly applied to the joint 30a of the housing 30 (see FIG. 2). Accordingly, the joint 30a need to be sealed with high precision to joint the joint surfaces together in a liquid tight manner. This may lead to the increase in manufacturing cost. In addition, where a flywheel 110 is positioned at the front side of the housing 30 (see FIG. 2), and the housing is designed to reserve the hydraulic fluid throughout the entire region of the housing, the flywheel 110 has a portion positioned in the reserved hydraulic fluid, which may cause the deterioration in operation efficiency of the driving power source through the agitation resistance of the hydraulic fluid.

On the contrary, in this embodiment, the flange 33 is formed throughout the circumference in at, least a lower portion of the first housing section 31 to reserve the hydraulic fluid in the region on the rear side of the flange 33. This arrangement can accomplish the use of the housing as the hydraulic fluid tank without the necessity of applying the high precision sealing to the joint 30a and without the possibility of deteriorating the operational efficiency of the driving power source.

On the other hand, the hydraulic motor block 25 is, as illustrated in FIG. 2, connected to a front edge surface 32a of a second housing section 32. Specifically, in this embodiment, the second housing 32 has the front edge surface having a wider surface area to form an area 32a extending radially inwardly from the jointed portion between the first and second housing sections 31, 32. The hydraulic motor block 25 is mounted on the thus formed area 32a, and has a rear surface with the hydraulic motor 20 mounted thereon.

The housing 30 encloses the hydraulic pump block 15 and the hydraulic motor block 25 to prevent them from being exposed to the outside, thereby preventing the load acting on the frame of the vehicle body from influencing the blocks 15, 25.

Specifically, where the blocks 15, 25 are exposed to the outside of the housing to constitute a part of the frame of the vehicle body, the blocks are subjected to bending stress, which may lead to the leakage of the hydraulic fluid through hydraulic fluid passages formed in the blocks, and hence the leakage through the joint portion of the housing or the like. This can however be prevented with the arrangement according to this embodiment. Moreover, even if the hydraulic fluid is leaked from the blocks, the housing enclosing the blocks can effectively prevent the leakage of the hydraulic fluid to the outside of the housing.

In the meantime, in this embodiment, the hydraulic pump 10 is fluidly connected to the hydraulic motor 20 in the manner as described hereinafter. That is, the hydraulic pump block 15 and the hydraulic motor block 25 respectively have the rear side and the front side, which face each other within the first housing section 31, the former forming a pair of ports 208a respectively communicating with an inlet and an outlet of the hydraulic pump 10 (see FIG. 4), and the latter forming a pair of ports 208b respectively communicating with an inlet and an outlet of the hydraulic motor 20 (see FIG. 5). The pair of ports 208a are connected to the pair of ports 208b via a pair of connecting pipes 202 extending in the vehicle longitudinal direction within the first housing section 31, so that the hydraulic fluid is circulated between the hydraulic pump 10 and the hydraulic motor 20 (see FIGS. 2 and 3). According to this arrangement with the pair of connecting pipes disposed within the housing, even if the hydraulic fluid is leaked through the connecting portions in the fluid circulation passage, it is unlikely to leak to the outside of the housing.

When assembling the housing, the connecting pipes 202 have the first ends respectively inserted into either the pair of ports 208a or the pair of ports 208b. The first and second housing sections 31 and 32 respectively carrying the blocks 15 and 25 with the connecting pipes 202 mounted on either one of the blocks are brought to the setting positions, so that the connecting pipes 202 have the second ends inserted into the residual ports 208 or 208b. Before jointing the first housing section 31 to the second housing section 32, the visual observation is made via a window (not shown) formed in the wall of the first housing section 31 to check if the second ends have been inserted into the residual ports 208 or 208b. After confirming the insertion of the second ends, slip-out preventive members 202a are mounted to the rear side of the hydraulic pump block 15 and the front side of the hydraulic motor block 25 through the window.

The pump shaft 12 has the front end operatively coupled to the driving power source, and the rear end extending rearward through the hydraulic pump block 15 to form a rear extension.

The rear extension of the pump shaft 12 is non-rotatably coupled to a power transmission shaft for the PTO, which is coaxially aligned with the pump shaft, in non-rotatable manner with respect to each other. A charge pump 18 is disposed around the rear extension of the pump shaft 12 to feed pressurized hydraulic fluid into a hydraulic circuit between the hydraulic pump 10 and the hydraulic motor 20.

In this embodiment, the power transmission shaft 71 for the PTO includes a first middle shaft 71a non-rotatably coupled to the rear extension of the pump shaft 12, and a second middle shaft 71b coaxially disposed relative to the first middle shaft 71a and extending rearward through the hydraulic motor block 25 to be operatively coupled to the PTO shaft 70. The second middle shaft 71b has a portion on the front side of the hydraulic motor block 25, on which a clutch/brake switching device 72 is supported, as illustrated in FIG. 2.

The clutch/brake switching device 72 is designed to switch on/off the transmission of the power from the pump shaft 12 to the PTO shaft 70. In this embodiment, the first middle shaft 71a is coupled to the second middle shaft 71b via the clutch/brake switching device 72. Specifically, the clutch/brake switching device 72 is operable to switch on/off the power transmission from the first middle shaft 71a to the second middle shaft 71b to switch on/off the power transmission from the pump shaft 12 to the PTO shaft 70.

Figure 6:
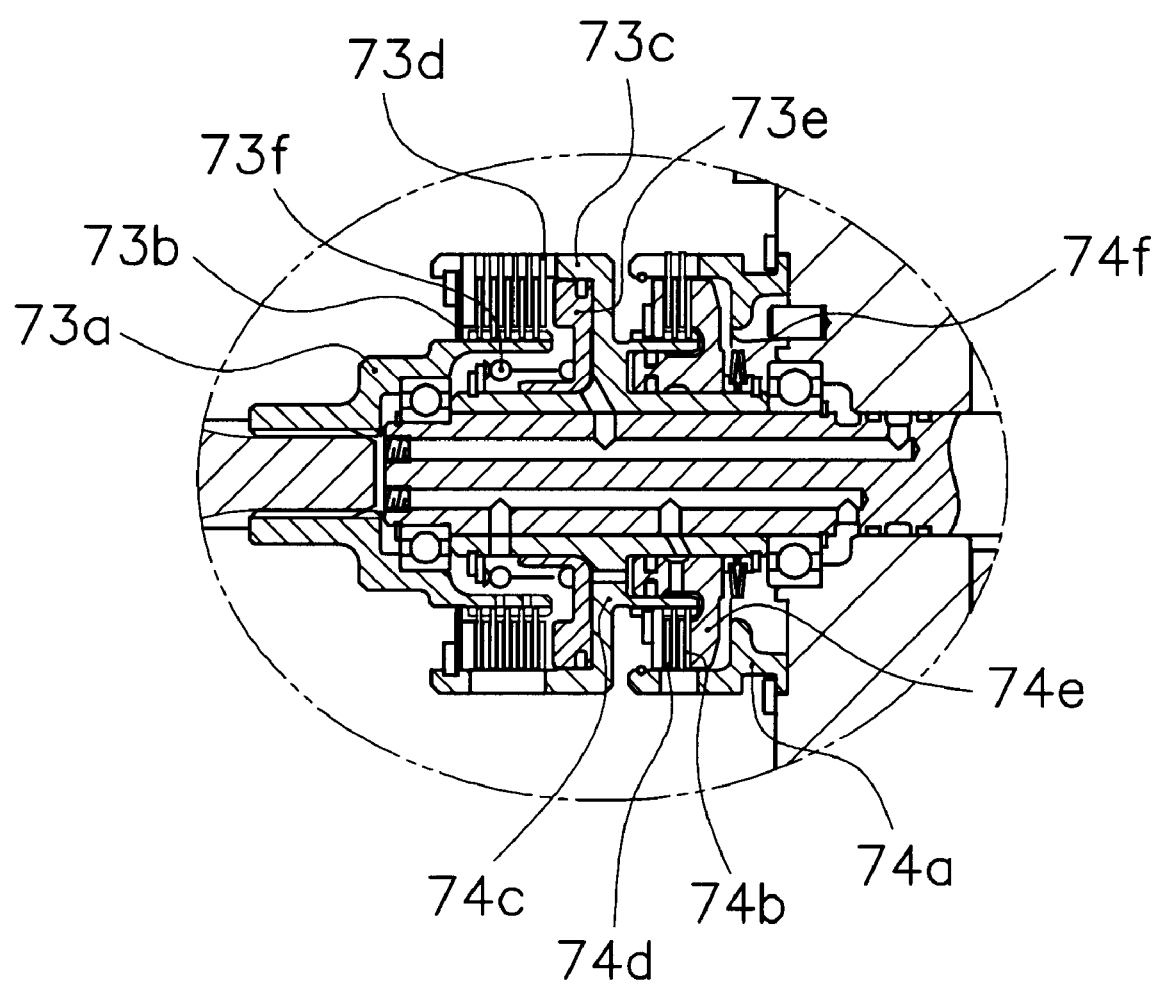
FIG. 6 is an enlarged view of the portion in the circle VI in FIG. 2.

FIG. 6 is an enlarged view of the portion in the circle VI in FIG. 2. As illustrated in this Figure, the clutch/brake switching device 72 includes a PTO clutch part 73 and a PTO brake part 74.

As best illustrated in FIG. 2, the PTO clutch part 73 includes a drive-side member 73a non-rotatably coupled to the first middle shaft 71a, a drive-side friction plate 73b non-rotatably and axially slidably supported on the drive-side member 73a, a driven-side member 73c non-rotatably supported on the second middle shaft 71b, a driven-side friction plate 73d non-rotatably and axially slidably supported on the driven-side member 73c, a clutch-side pressing member 73e for bringing the drive-side friction plate 73b into frictional engagement with the driven-side friction plate 73d by action of the pressurized hydraulic fluid, and a clutch-side biasing member 73f for biasing the pressing member 73e in a direction away from the drive-side friction plate 73b and the driven-side friction plate 73d.

On the other hand, the PTO brake part 74 includes a stationary member 74a non-rotatably coupled to the hydraulic motor block 25, a stationary-side friction plate 74b non-rotatably and axially slidably supported on the stationary member 74a, a rotational member 74c non-rotatably supported on the second middle shaft 71b, a rotational-side friction plate 74d non-rotatably and axially slidably supported on the rotational member 74c, a brake-side pressing member 74e disposed in an axially slidable manner, and a brake-side biasing member 74f for biasing the brake-side pressing member 74e to enable the brake-side pressing member 74e to bring the stationary-side friction plate 74b into frictional engagement with the rotational-side friction plate 74d. The brake-side pressing member 74e is adapted to travel in a direction away from the stationary-side friction plate 74b and the rotational-side friction plate 74d against the biasing force of the brake-side biasing member 74f, upon the receipt of the action of the pressurized hydraulic fluid from an electromagnetic valve (hereinafter described) attached on the side wall of the first housing section 31.

In this embodiment, the driven-side member 73c of the PTO clutch part 73 is integrally formed with the rotational member 74c of the PTO brake part 74.

Thus, the clutch/brake switching device 72 usually takes a clutch-disengaging and brake-engaging mode to shut off the power transmission from the first middle shaft 71a to the second middle shaft 71b. On the other hand, during the clutch/brake switching device 72 is subjected to the action of the pressurized hydraulic fluid, it takes a clutch-engaging and brake-disengaging mode to transmit the driving power from the first middle shaft 71a to the second middle shaft 71b.

The clutch/brake switching device 72 is provided to stop the rotation of the PTO shaft 70 for preventing unnecessary loss of the driving power where it is not necessary to take off the driving power through the PTO shaft 70.

The clutch/brake switching device 72 is designed to enable the PTO clutch part 73 and the PTO brake part 74 to selectively switch their operational modes. This arrangement is intended to immediately stop the rotation of the second middle shaft 71b and the PTO shaft 70 by engaging the brake part 74 when the clutch part 73 is disengaged, after the PTO shaft 70 has been rotated via the second middle shaft 71b by the engagement of the clutch part 73. Accordingly, when there exists no need for the immediate stop of the rotation of the PTO shaft 70, only the PTO clutch part 73 is provided, so that the manufacturing cost can be lowered.

In this embodiment, the power transmission shaft 71 for the PTO is divided into the first middle shaft 71a and the second middle shaft 71*b*, both of which are coupled together via the clutch/brake switching device 72. However, the present invention is not limited to this embodiment. Specifically, the power transmission shaft 71 can be formed as a single shaft, while the pump shaft 12 is coupled via the clutch/brake switching device 72 with the single formed power transmission shaft for the PTO.

In this embodiment, the second middle shaft 71*b* has the rear end coupled to the PTO shaft 70 via a mechanical transmission 75 for the PTO, as illustrated in FIG. 1, so that the output from the PTO shaft 70 has a variable speed.

The motor shaft 22 has the rear end provided with bearing support by a rotary joint device 85 supported on the second housing section 32. As best illustrated in FIG. 2, the rotary joint device 85 includes a body part 85*a* supported on the second housing section 32, and a tubular member 85*b* rotatably supported on the body part 85*a*. The rear end of the motor shaft 22 is non-rotatably inserted into the tubular member 85*b* through the front side thereof.

Now, the description will be made for the mechanical transmission 50 that is disposed in the rear stage of the HST 1 for stepwisely varying the speed of the output of the motor shaft 22.

The mechanical transmission 50, as illustrated in FIG. 2, includes an output shaft 51 disposed on the rear of the motor shaft 22 and aligned coaxially with the same, a power transmission mechanism 53 operatively coupled to the motor shaft 22 and adapted to transmit the power between the motor shaft 22 and a counter shaft 52 disposed parallel to the output shaft.

In this embodiment, a tubular shaft is rotatably mounted on the second middle shaft 71 to serve as the counter shaft 52, thereby achieving little occupation of the space. Non-rotatably supported on the tubular shaft 52 is a gear meshing with a gear non-rotatably supported on the tubular member 85*b*, thereby operatively coupling the tubular shaft 52 to the motor shaft 22.

Figure 7:
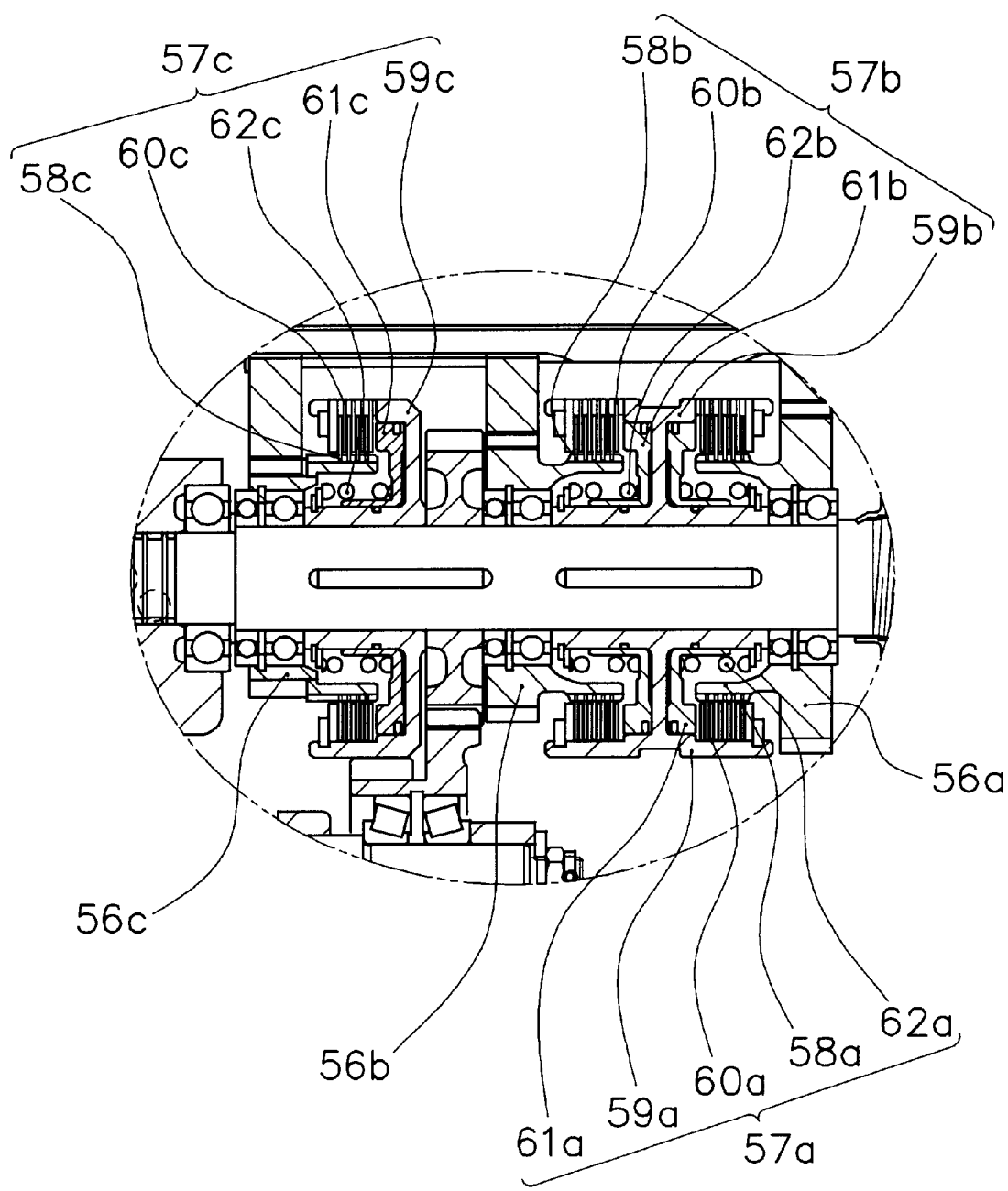
FIG. 7 is an enlarged view of the portion in the circle VII in FIG. 2.

FIG. 7 is an enlarged view of the portion in the circle VII in FIG. 2. As illustrated in this Figure, the power transmission mechanism 53 includes a gear transmission device 54. The gear transmission device 54 includes a fixed gear 55 non-rotatably supported on the tubular shaft 52, an idle gear 56 rotatably supported on the output shaft 51 in meshed engagement with the fixed gear 55, and a clutch member 57 supported on the output shaft 51. In this embodiment, the power transmission mechanism 53 includes three gear transmission devices 54*a*, 54*b* and 54*c* respectively for the first to third speed stages. By the selective engagement of these devices, the speed can be changed in three stages.

The gear transmission devices for the first to third speed stages respectively include clutch members 57*a*, 57*b* and 57*c*, which in turn respectively include drive-side friction plates 58*a*, 58*b* and 58*c* non-rotatably and axially slidably coupled respectively to idle gears 56*a*, 56*b* and 56*c*, body parts 59*a*, 59*b* and 59*c* non-rotatably supported on the output shaft 51, driven-side friction plates 60*a*, 60*b* and 60*c* non-rotatably and axially slidably coupled respectively to the body parts, pressing members 61*a*, 61*b* and 61*c* for applying pressure so as to bring the drive-side friction plates into frictional engagement with the driven-side friction plates by action of the pressurized hydraulic fluid, and biasing members 62*a*, 62*b* and 62*c* for biasing the pressing members in a direction away from the drive-side friction plates and the driven-side friction plates.

The output shaft 51 has the front end supported on the body part 85*a* and the tubular member 85*b* of the rotary joint device 85, as illustrated in FIGS. 2 and 3. The portion of the output shaft 51 supported on the body part 85*a* forms therein three annular grooves 51*a*, 51*b* and 51*c*, while the body part 85*a* forms therein communication holes 86*a*, 86*b* and 86*c* (only the communication hole 86*a* depicted in FIG. 3) respectively for the communication of the annular grooves to the outside. The communication holes 86*a*, 86*b* and 86*c* are connected to electromagnetic change valves 88 provided in an outer wall surface of the second housing section 32 via conduits 87.

On the other hand, the output shaft 51 forms therein three shaft holes (not shown) respectively communicating with the three annular grooves 51*a*, 51*b* and 51*c*. These three shaft holes respectively function for the communication between the annular grooves 51*a*, 51*b*, 51*c* and the clutch members 57*a*, 57*b* and 57*c* of the gear transmission devices for the first to third speed stages.

Specifically, the pressing member 61*a*, 61*b* or 61*c* of one of the clutch members 57*a*, 57*b*, 57*c* brought into communication with a hydraulic fluid passage selected through the operation of the electromagnetic change valves 88 presses, by action of the pressurized hydraulic fluid, the drive-side friction plate 58*a*, 58*b* or 58*c*, and the driven-side friction plate 60*a*, 60*b* or 60*c* against the biasing force of the biasing member 62*a*, 62*b* or 62*c*, thereby enabling the selected clutch member 57*a*, 57*b* or 57*c* to be brought into engaging state and hence the output shaft 51 to obtain the rotational force corresponding to the change gear ratio of the gear transmission device having the selected clutch member.

The output shaft 51 is coupled to a differential gear device 90 coupled to the rear axles, and operatively coupled to the front driving shaft 80 via a suitable power transmission mechanism. Accordingly, the driving power whose speed has been changed to a desirable rotational speed via the HST 1 and the mechanical transmission 50 is transmitted from the output shaft 51 to the rear axles and the front axles.

In this embodiment, the pump shaft 12 with the front end operatively connected to the driving power source has the rear end extending rearwards to form a rear extension coupled to the power transmission shaft 71 for the PTO to constitute a PTO power transmission path, while the output from the motor shaft 22 has the speed stepwisely varied via the mechanical transmission 50, and is transmitted to the output shaft 51 to constitute a running power transmission path. Moreover, the power transmission shaft 71 for the PTO is coaxially aligned with the pump shaft 12, while the output shaft 51 is coaxially aligned with the motor shaft 22. The tubular shaft 52 mounted on the power transmission shaft 71 for the PTO is used as the counter shaft adapted to carry out the speed change in the path to the output shaft 51. This arrangement results in lesser occupation of the space and improvement in power transmission efficiency.

In the meantime, to achieve the lesser occupation of the space, it is preferable to set the distance between the output shaft 51 and the tubular shaft 52 as shorter as possible. On the other hand, the distance between the tubular shaft 52 and the output shaft 51 depends on the change gear ratio therebetween. Specifically, the change gear ratio between the tubular shaft 52 and the output shaft 51 is determined by the ratio of the number of teeth (equivalent to pitch diameter ratio) of the fixed gear supported on the tubular shaft 52 and the idle gear supported on the output shaft in such a manner as to be meshed with the fixed gear. Accordingly, the distance between the tubular shaft 52 and the output shaft 51 is preferably set as short as possible within such a range as to obtain a desirable pitch diameter ratio.

On the other hand, in the conventional HST with the hydraulic pump and the hydraulic motor aligned with one another on the single block, the distance between the pump shaft and the motor shaft is varied according to the volume of the HST. That is, in the conventional arrangement with the hydraulic pump and the hydraulic motor aligned with one another, it is necessary to dispose the hydraulic pump away from the hydraulic motor by such a distance as to avoid contact therebetween. Accordingly, the distance between the pump shaft and the motor shaft is necessarily widened. Particularly, for the HST with high power spec, which involves a large volume of the HST, the distance between the pump shaft and the motor shaft is widened.

As described above, it is preferable to dispose the output shaft 51 and the counter shaft (tubular shaft) 52 coaxially with the motor shaft 22 and the pump shaft 12, respectively. However, where the hydraulic pump and the hydraulic motor are disposed in the vehicle width direction, and the output shaft 51 and the counter shaft (tubular shaft) 52 are coaxially disposed respectively with the motor shaft and the pump shaft, the distance between the output shaft 51 and the counter shaft 52 may become larger than the distance determined by the pitch diameter ratio between the fixed gear and the idle gear. Such distance between the output shaft 51 and the counter shaft 52 invites the increase in size of the second housing section 32.

On the contrary, according to this embodiment with the hydraulic pump 10 and the hydraulic motor 20 respectively mounted on the block 15 and the block 25, both blocks being separately arranged from one another, and disposed along the vehicle longitudinal axis, it is possible to shorten the distance between the pump shaft 12 and the motor shaft 22 regardless of the sizes of the hydraulic pump 10 and the hydraulic motor 20. Accordingly, it is possible to dispose the counter shaft 52 and the output shaft 51 coaxially with the pump shaft 12 and the motor shaft 22 respectively without invitation of the increase in size of the second housing section 32.

Figure 8:
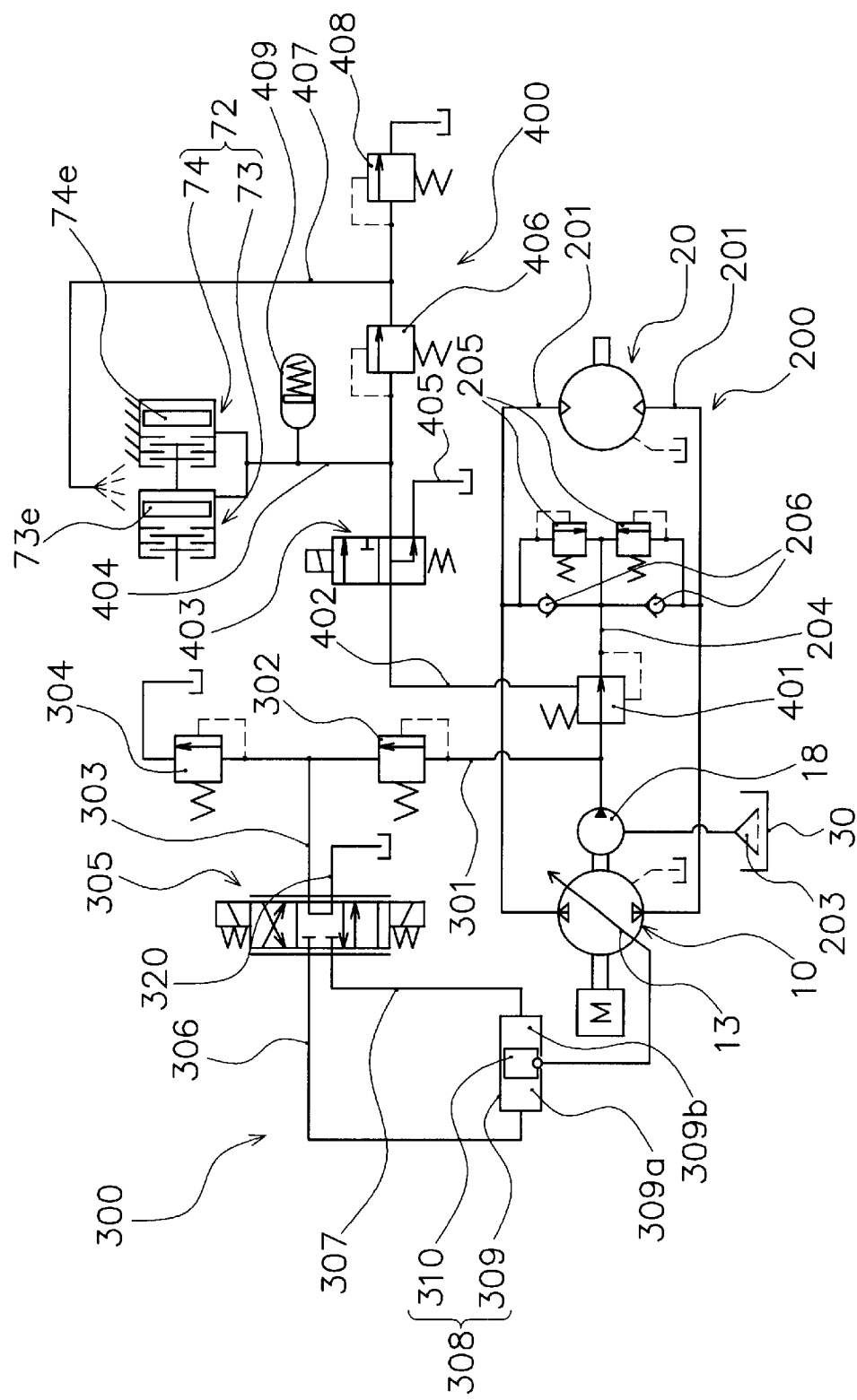
FIG. 8 is a hydraulic circuit diagram of the HST and a clutch/brake switching device of FIG. 1.

The description will hereinafter be made for the hydraulic circuits in the HST 1 and the clutch/brake switching device 72. FIG. 8 is the hydraulic circuit diagram of the HST 1 and the clutch/brake switching device 72.

As illustrated in FIG. 8, the hydraulic pump 10 and the hydraulic motor 20 are respectively connected by a pair of high pressure/low pressure lines 201, which respectively serve as a low pressure side and a high pressure side during the forward travel or the rearward travel of the vehicle, thereby constituting a closed circuit 200. In this embodiment, as illustrated in FIGS. 2 and 3, the pair of lines 201 are partially formed by conduits 202 disposed between a hydraulic fluid passage of the hydraulic pump block 15 and a hydraulic fluid passage of the hydraulic motor block 25 for the communication between these passages.

The charge pump 18 is mounted on the rear side of the hydraulic pump block 15, as illustrated in FIGS. 1 and 2. Specifically, in this embodiment, the charge pump 18 is mounted within the space defined by the hydraulic pump block 15 and the hydraulic motor block 25, thereby achieving the effective use of the dead space within the housing 30.

The charge pump 18 is adapted to suck the hydraulic fluid reserved in a space on the rear of the flange 33 of the first housing section 31 via a filter 203, and discharge the same to a charge line 204.

Connected to the charge line 204 are a hydraulic pressure circuit 300 for the operation of the swash plate, a hydraulic pressure circuit 400 for the clutch/brake switching device, and the closed circuit 200. That is, the pressurized hydraulic fluid from the charge pump 18 is fed to the respective hydraulic pressure circuits 200, 300 and 400.

As illustrated in FIG. 8, the closed circuit 200 includes high-pressure relief valves 205 for setting the hydraulic pressure of the pair of high pressure/low pressure lines 201, and check valves 206 for accepting the flow of the pressurized hydraulic fluid from the charge line 204 into the pair of high pressure/low pressure lines 201 and preventing the reverse flow. These high-pressure relief valves 205 and the check valves 206 are provided in the hydraulic pump block 15, as illustrated in FIG. 4. In this Figure, the reference code 207 represents a connection port for connection between the charge line 204 and the closed circuit 200.

The hydraulic pressure circuit 300 for the operation of the swash plate includes a first suction line 301 having a first end connected to the charge line 204, a resistance valve 302 interposed in the first suction line 301, a second suction line 303 branched from the first suction line 301 on the downstream side of the resistance valve 302, a second relief valve 304 interposed in the first suction line 301 on the downstream side of the connection point with the second suction line 302 for setting the hydraulic pressure of the second suction line 303, three-position switching valve 305 connected to the downstream end of the second suction line 303, a discharge line 320 connected to the front stage of the three-position switching valve 305, first and second pressurized fluid lines 306 and 307 connected to the rear stage of the three-position switching valve 305, and a hydraulic cylinder 308 connected to the downstream ends of the first pressurized fluid line 306 and the second pressurized fluid line 307.

The hydraulic cylinder 308 includes a cylinder body 309, and a piston 310 defining a first hydraulic fluid chamber 309a and a second hydraulic fluid chamber 309b within the cylinder body 309 and movable within the same. The piston 310 is coupled to the angularly adjustable swash plate 13 of the hydraulic pump 10 to angularly move the swash plate 13 in association with the movement of the piston 310.

The first and second pressurized fluid lines 306 and 307 have the downstream ends respectively communicating with the first hydraulic fluid chamber 309a and the second hydraulic fluid chamber 309b of the hydraulic cylinder 309.

The three-position switching valve 305 is adapted to take a first feeding position for feeding hydraulic fluid to the first hydraulic fluid chamber 309a by connecting the second suction line 303 and the discharge line 320 respectively to the first pressurized fluid line 306 and the second pressurized fluid line 307, a second feeding position for feeding hydraulic fluid to the second hydraulic fluid chamber 309b by connecting the discharge line 320 and the second suction line 303 respectively to the first pressurized fluid line 306 and the second pressurized fluid line 307, and a neutral position for closing the first pressurized fluid line 306 and the second pressurized fluid line 307.

The three-position switching valve 305 is designed to receive a control signal generated according to an operation angle of an operation lever (not shown) for the angularly adjustable swash plate 13. With this arrangement, the three-position switching valve 305 takes the first feeding position or the second feeding position for a specific period of time according to the operation angle, and then takes the neutral position by receiving a feedback signal representative of a specific tilting angle of the angularly adjustable swash plate 13.

Specifically, by tilting the operation lever through a predetermined angle, the three-position switching valve 305 takes the first feeding position or the second feeding position for a specific period of time according to the predetermined angle. Whereby, either one of the first pressurized fluid line 306 and the second pressurized fluid line 307 is connected to the second suction line 303, while the remaining one is connected to the discharge line 320. Accordingly, the hydraulic fluid is fed to the hydraulic fluid chamber communicating with either the first or second pressurized fluid line which has been connected to the second suction line 303, and the hydraulic fluid within the remaining hydraulic chamber is discharged via the discharge line 320. Whereby, the piston 310 travels to a predetermined position, and allows the angularly adjustable swash plate 13 to tilt by a predetermined angle. The three-position switching valve 305 is then returned to the neutral position to hold the piston at the predetermined position. Thus, the angularly adjustable swash plate 13 is held in a tilting position by a predetermined angle.

The three-position switching valve 305 is mounted on the rear side of the hydraulic pump block 15, as illustrated in FIG. 3.

Now, the description will be made for the hydraulic pressure circuit 400 for the clutch/brake switching device. As illustrated in FIG. 8, the hydraulic pressure circuit 400 includes a third suction line 402 connected to the charge line 204 via a pressure reducing valve 401 for setting the hydraulic pressure in the charge line 204, an electromagnetic valve 403 connected to the downstream end of the third suction line 402, a third pressurized fluid line 404 and a discharge line 405 connected to the rear stage of the electromagnetic valve 403, a relief valve 406 for setting the hydraulic pressure in the third pressurized fluid line 404, a lubricant line 407 branched from the third pressurized fluid line 404 on the downstream side of the relief valve 406, and a relief valve 408 for setting the hydraulic pressure in the lubricant line 407.

The third pressurized fluid line 404 has the downstream end communicating with the clutch/brake switching device 72 so that the pressurized fluid can act on the clutch-side pressing member 73e and the brake-side pressing member 74e.

The lubricant line 407 is adapted to feed the lubricant to the respective friction plates of the clutch/brake switching device 72.

The electromagnetic valve 403 is adapted to take a clutch-engaging position for connecting the third suction line 402 to the third pressurized fluid line 404, and a brake-engaging position for connecting the third suction line 402 to the discharge line 405.

Specifically, where it is desired to take off the driving power through the PTO shaft 70, the electromagnetic valve 403 is shifted to the clutch-engaging position. Whereby, the pressurized fluid is fed to the clutch/brake switching device 72 via the third pressurized fluid line 404. By action of the thus fed pressurized fluid, the clutch-side pressing member 73e is moved in such a direction as to bring the drive-side friction plate 73b into frictional engagement with the driven-side friction plate 73d against the biasing force of the clutch-side biasing member 73f, so that the PTO clutch part 73 is brought into the engaging state. On the other hand, by action of the pressurized fluid from the third pressurized fluid line 404, the brake-side pressing member 74e is moved in a direction away from the stationary-side friction plate 74b and the rotational-side friction plate 74d against the biasing force of the brake-side biasing member 74f. Accordingly, the PTO brake part 74 is brought into the shut-down state.

On the other hand, where the rotation of the PTO shaft 70 is to be stopped, the electromagnetic valve 403 is shifted to the brake-engaging position. Whereby, the third suction line 402 is brought into communication with the discharge line 405, thereby stopping the feeding of the pressurized fluid to the third pressurized fluid line 404. As described above, the clutch-side pressing member 73e is biased in a direction away from the drive-side friction plate 73b and the driven-side friction plate 73d, so that the power transmission from the drive-side friction plate 73b to the driven-side friction plate 73d is not performed during the pressurized fluid causes no effect. On the other hand, the brake-side pressing member 74e constantly presses the stationary-side friction plate 74b and the rotational-side friction plate 74d in such a direction as to bring them into frictional engagement with each other through the brake-side biasing member 74f. Accordingly, during the electromagnetic valve 403 lies at the brake-engaging position, the PTO clutch part 73 remains shut down, while the PTO brake part 74 remains engaged.

In FIG. 8, the numeral code 409 represents a hydraulic pressure buffering member for preventing the pressurized fluid fed to the third pressurized fluid line 404 from abruptly acting on the clutch/brake switching device 72, thereby accomplishing the smooth engagement of the respective friction plates.

In this embodiment, the hydraulic pump block 15 has the front side to which the hydraulic pump 10 is mounted, while the hydraulic motor block 25 has the rear side to which the hydraulic motor 20 is mounted. However, the present invention is not limited to this arrangement. As long as the hydraulic pump 10 and the hydraulic motor 20 are disposed along the vehicle longitudinal axis, various arrangements can be employed.

However, considering the effective use of the space defined by the hydraulic pump block 15 and the hydraulic motor block 25, and the decreasing in size of the housing 30 constituting at least a part of the vehicle body, it is preferable to employ the arrangement with at least one of the hydraulic pump 10, the hydraulic motor 20 and the charge pump 30 disposed within the space mentioned above.

Figure 9:
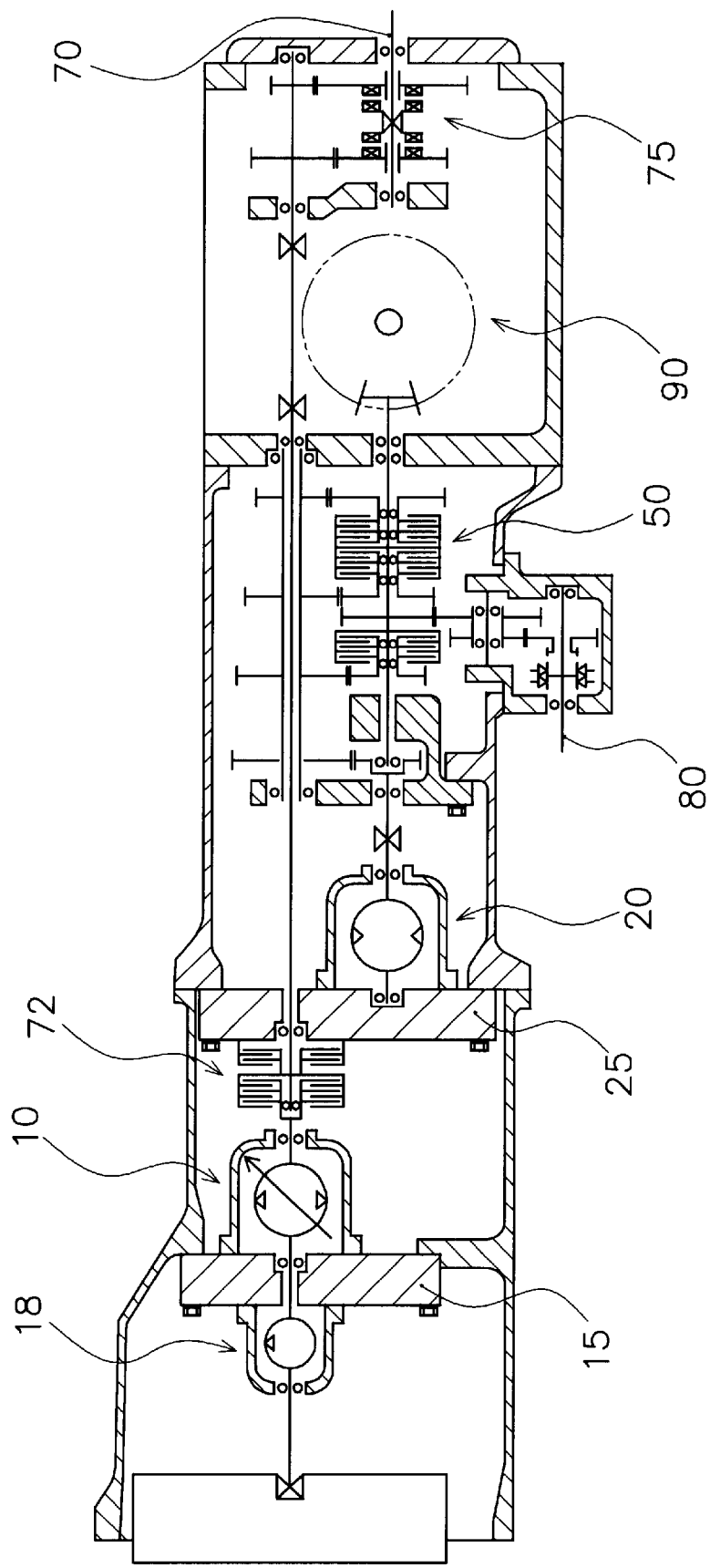
FIG. 9 is a typical view illustrating a part of the power transmission path of the vehicle with the HST according to another embodiment of the present invention.
Figure 10:
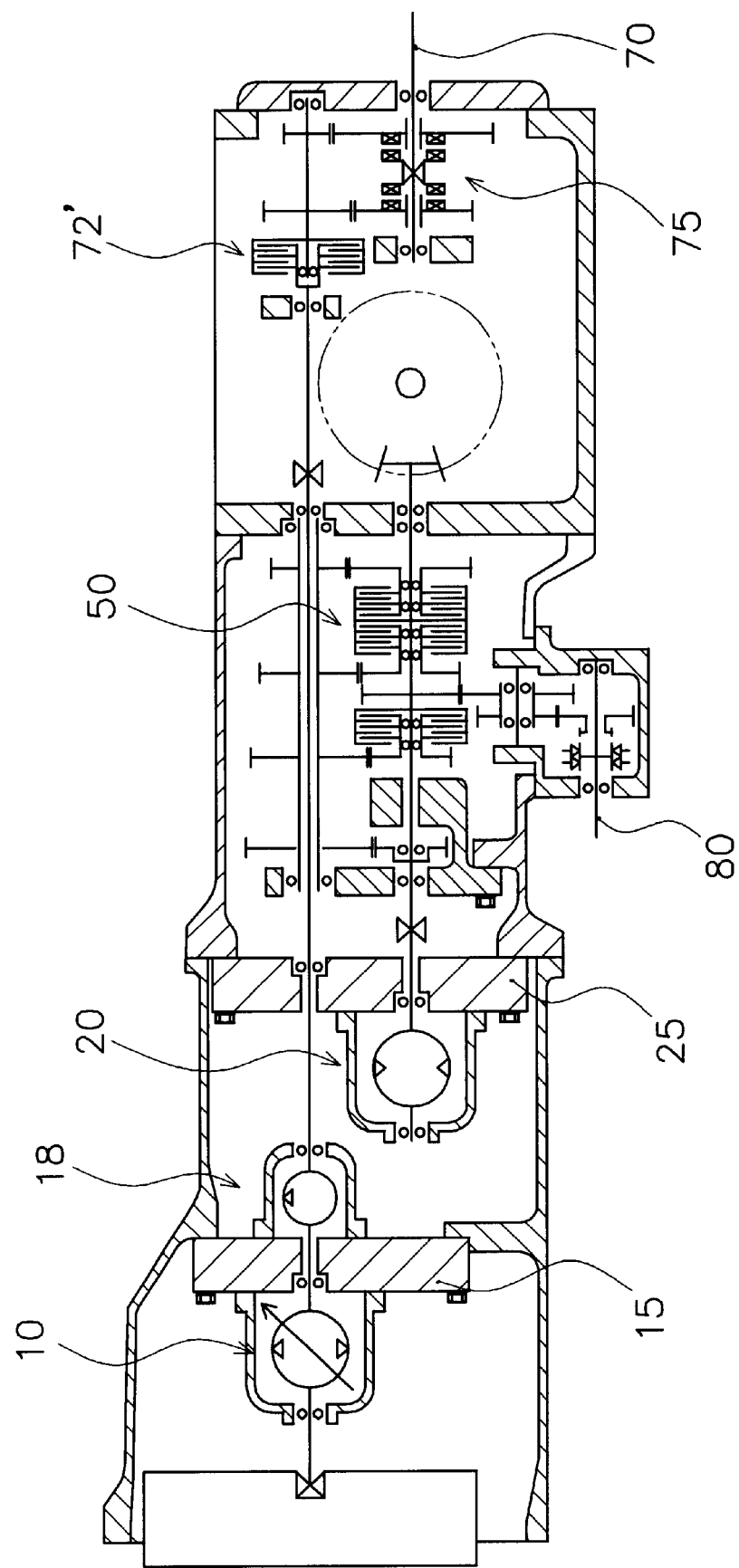
FIG. 10 is a typical view illustrating a part of the power transmission path of the vehicle with the HST according to still another embodiment of the present invention.
Figure 11:
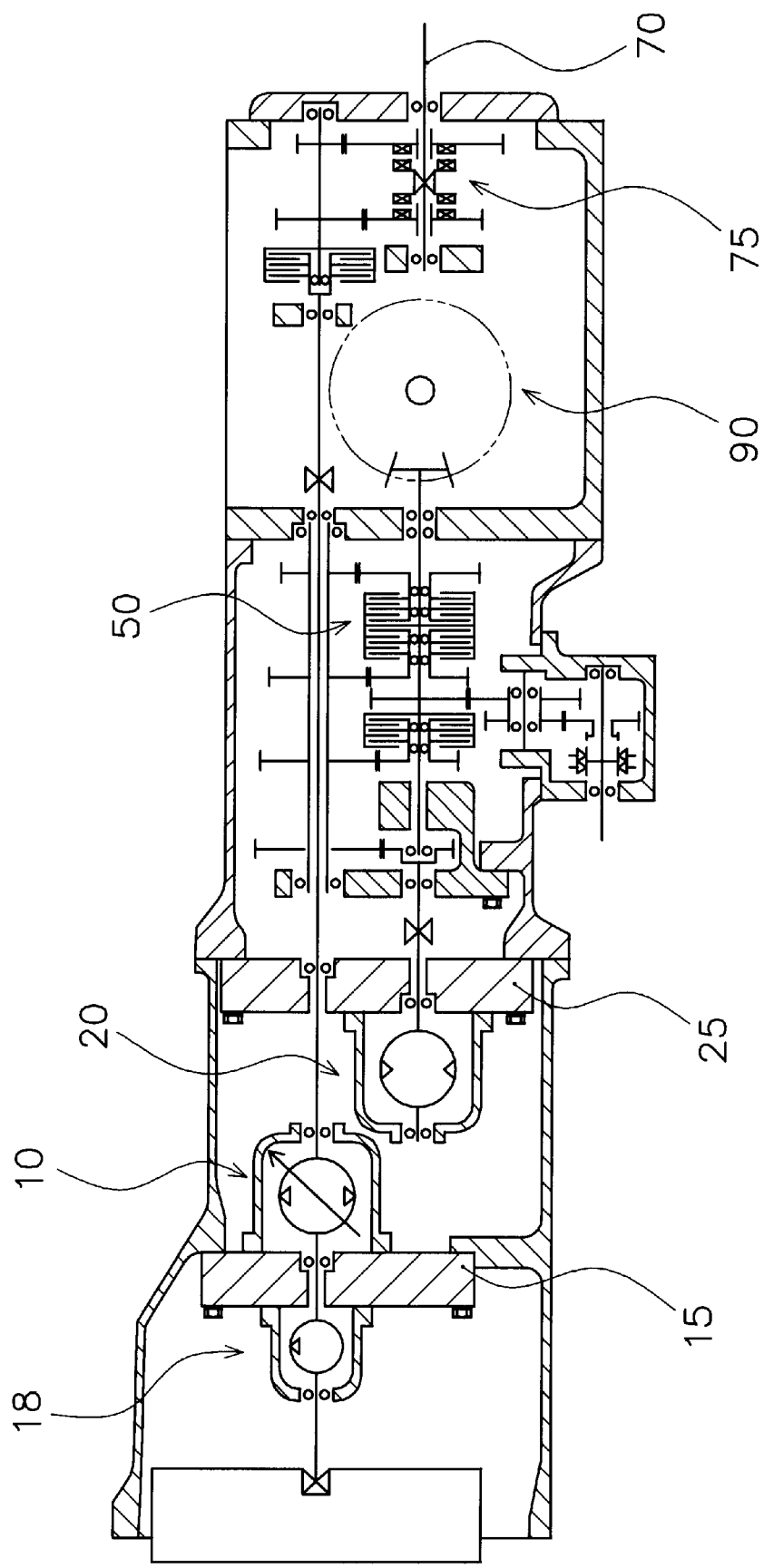
FIG. 11 is a typical view illustrating a part of the power transmission path of the vehicle with the HST according to yet another embodiment of the present invention.

That is, as in this embodiment, it is possible to dispose only the charge pump 18 within the space (see FIG. 1), or only the hydraulic pump 18 within the same as illustrated in FIG. 9. Alternatively, it is possible to employ the arrangement with the charge pump 18 and the hydraulic motor 20 disposed within the space as illustrated in FIG. 10, or the arrangement with the hydraulic pump 10 and the hydraulic motor 20 disposed within the space as illustrated in FIG. 11.

In this embodiment, the clutch/brake switching device 72 is also disposed within the space in consideration of the effective use of the dead space and effective piping arrangement for the hydraulic passage. However, it is possible to locate the clutch/brake switching device 72 near the PTO shaft 70.

This specification is by no means intended to restrict the present invention to the preferred embodiments set forth therein. Various modifications to the hydrostatic transmission and the power transmission arrangement with the same for vehicle, as described herein, may be made by those skilled in the art without departing from the spirit and scope of the present invention as defined in the appended claims.

What is claimed is:

1. A hydrostatic transmission used for vehicle with a vehicle body comprising:

a hydraulic pump;

a hydraulic motor fluidly connected with said hydraulic pump;

a housing accommodating said hydraulic pump and said hydraulic motor, a hydraulic pump block supporting said hydraulic pump; and a hydraulic motor block separately arranged from said hydraulic pump block and supporting said hydraulic motor wherein each are separable from said housing; and, wherein said hydraulic pump and said hydraulic motor are spaced apart along the vehicle longitudinal axis via said hydraulic pump block and said hydraulic motor block.

2. A hydrostatic transmission according to claim 1, wherein said hydraulic pump block and said hydraulic motor block are enclosed by said housing.

3. A hydrostatic transmission according to claim 1, wherein:

said hydraulic pump and said hydraulic motor are disposed in sequence from an upstream side to a downstream side of a power transmission path;

said housing has an inner peripheral wall provided with a flange radially inwardly extending from said inner peripheral wall, and said hydraulic pump block is mounted on said flange; and said flange is formed throughout the circumference of at least a lower portion of said inner peripheral wall in a first housing section.

4. A hydrostatic transmission according to claim 1, further comprising:

a charge pump for replenishing pressurized hydraulic fluid into a hydraulic circuit fluidly connecting said hydraulic pump with said hydraulic motor, wherein:

at least one of said hydraulic pump, said hydraulic motor and said charge pump is disposed within a space defined by said hydraulic pump block and said hydraulic motor block within said housing.

5. A hydrostatic transmission according to claim 1, wherein:

said housing accommodating said hydraulic pump and said hydraulic motor constitutes at least a part of the vehicle body.

6. A power transmission arrangement for vehicle with a vehicle body comprising:

a hydrostatic transmission including:

a hydraulic pump having a pump shaft extending along the vehicle longitudinal axis and having a first end operatively coupled to a driving power source for enabling the driving power to be inputted to said pump shaft;

a hydraulic motor having a motor shaft for non-stepwisely varying the speed of said driving power inputted to said pump shaft in cooperation with said hydraulic pump and then outputting said driving power through said motor shaft;

a housing accommodating said hydraulic pump and said hydraulic motor, and designed to constitute at least a part of a frame of said vehicle body;

a hydraulic pump block supporting said hydraulic pump; and a hydraulic motor block supporting said hydraulic motor, wherein said hydraulic pump and said hydraulic motor are, disposed from a first side to a second side along the vehicle longitudinal axis respectively via the hydraulic pump block and the hydraulic motor block;

a PTO shaft for taking off the driving power of the driving power source and transmitting the same to the outside of the vehicle body;

a PTO power transmission shaft disposed on a second side of said pump shaft along the vehicle longitudinal axis and coaxially aligned with said pump shaft, said PTO power transmission shaft being adapted to transmit the driving power between said pump shaft and said PTO shaft; and a clutch device disposed within a space within said housing defined by the hydraulic pump block and the hydraulic motor block for selectively transmitting the driving power of the pump shaft to said PTO power transmission shaft and shutting off the same.

7. A power transmission arrangement for vehicle according to claim 6, further comprising:

an output shaft disposed on the second side of the motor shaft along the vehicle longitudinal axis and aligned coaxially with said motor shaft;

a counter shaft disposed parallel to said output shaft and operatively coupled to said motor shaft; and a power transmission mechanism for transmitting the driving power from said counter shaft to said output shaft;

wherein said counter shaft is a tubular shaft rotatably mounted on said PTO power transmission shaft.

8. A power transmission arrangement for vehicle according to claim 7, wherein:

said power transmission mechanism includes a plurality of gear transmission devices respectively having different gear ratios; and said power transmission mechanism is designed so that one of said plurality of gear transmission devices is selectively brought into engaging state.

* * * * *